Feb. 15, 1927.
G. GRUNBERG
1,617,844
PERFUME BOTTLE
Filed June 26, 1926
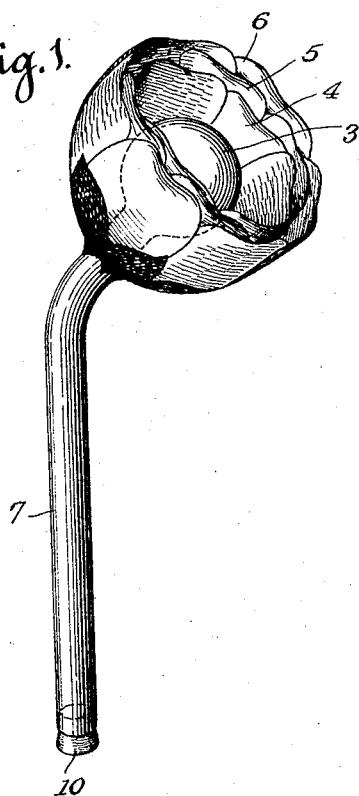
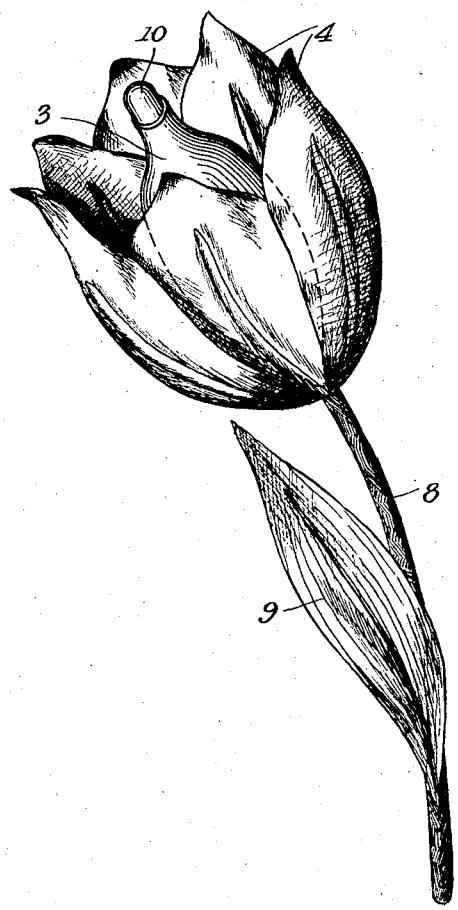
INVENTOR
George Grunberg
BY
Philip S. McLean.
ATTORNEY Patented Feb. 15, 1927.

1,617,844

UNITED STATES PATENT OFFICE.

GEORGE GRUNBERG, OF NEW YORK, N. Y.

PERFUME BOTTLE.

Application filed June 26, 1926. Serial No. 118,638.

The objects of this invention are to provide an attractive and ornamental container for perfumes resembling or having the characteristics of a flower and which in addition to being sightly and desirable because of that feature, will be relatively inexpensive and entirely practical.

These objects are attained by the formation of the vial or container proper as the corolla of the flower and the association with such corolla of one or more whorls of petals forming the calyx of the flower.

Other novel features of the invention will appear as the specification proceeds.

The drawing accompanying and forming part of this specification illustrates two different embodiments of the invention, Figure 1 representing a perspective view of a flower container of the rose-bud type and Figure 2 a container of the tulip type.

In both views the corolla of the flower is provided by a vial 3 of a bulbous nature, the first being of a generally spherical shape to accord with the outline of the flower and the second being elongated to accord with the general elongate nature of the second flower.

In both instances also the corolla portion is surrounded by a whorl of petals 4 more or less enclosing the corolla and forming in combination therewith, the calyx structure. There may be a plurality of such whorls as in Figure 1 as shown at 5 and 6.

The stem of the flower may be provided by an integral hollow stem continuation of the bulb as shown at 7 in Figure 1 or by a separately attached covered wire stem such as shown at 8 in Figure 2. One or more leaves may be attached to the stem as shown at 9 in Figure 2.

The vial may be closed by a suitable stopper 10, which as indicated in Figure 1 may be applied to the lower end of the hollow stem, or as indicated in Figure 2, be applied to the exposed central tip of the corolla. This latter stopper, which usually is of cork, thus forms a mechanical guard or protection for the exposed end of the fragile vial.

The corolla may be made of glass and the petals of waxed paper cloth or the like. These petals may be formed separately or as one continuous piece and may be cemented or otherwise secured as a collar about the stem of the flower. Being spaced from the bulb and extending from the rear, forwardly about the sides of the same, these petals serve as a flexible enclosure protecting the fragile bulb.

The general effect is that of a flower and the corolla or the perfume within the same may be colored to heighten the simulation. The perfume may be that of the natural flower so that the container as a whole serves as a representation of the character of the perfume.

Where the stopper is located at the tip of the corolla, the same is preferably rounded off or otherwise shaped to form a continuation or extension of the corolla, giving the same a more or less natural appearance as indicated in Figure 1.

The vial forming the corolla being relatively fragile is particularly liable to injury when mounted on a flexible wire stem as in Figure 2. In such case the petals are of especial importance, forming as they do, a protective enclosure about the fragile, freely movable container, protecting the same when packed and also when it strikes against any hard object because of the resiliency of the stem.

What is claimed is:

1. A perfume container comprising a fragile vial in simulation of the corolla of a flower, a flexible wire stem supporting said corolla vial in freely movable relation and a whorl of petals surrounding and at least partially enclosing the fragile corolla vial to protect the same against breakage in case the flexible stem permits the corolla vial to swing into contact with an object which otherwise might break the same.

2. A perfume container comprising a fragile vial in simulation of the corolla of a flower, a stem supporting said fragile corolla vial in free elevated relation and a whorl of petals surrounding the entire rearward portion of the fragile vial and projecting forwardly about the sides of the same to constitute with the corolla the calyx of the flower, and said petals being spaced about the vial to form a partial enclosure and a mechanical protection which by its spacing will be yieldable to protect the fragile corolla from injury.

3. A perfume container comprising a fragile vial in simulation of the corolla of a flower, a stem supporting said fragile corolla vial in free elevated relation and a whorl of petals surrounding the entire rearward portion of the fragile vial and projecting forwardly about the sides of the same to constitute with the corolla the calyx of the flower, and said petals being spaced about the vial to form a partial enclosure and a mechanical protection which by its spacing will be yieldable to protect the fragile corolla from injury, the corolla vial having a stopper in the top of the same forming substantially a continuation of the corolla shape and providing mechanical protection for the tip of said vial.

In witness whereof, I have hereunto set my hand this 24 day of June, 1926.

GEORGE GRUNBERG.